United States Patent

[11] 3,591,213

| [72] | Inventor | Jack Turner |
| | | Nathershaw, Oldham Lancashire, England |
| [21] | Appl. No. | 649,678 |
| [22] | Filed | June 28, 1967 |
| [45] | Patented | July 6, 1971 |
| [73] | Assignee | Kenneth Broadbent |
| | | Lydgate, Oldham, England |
| | | a part interest |
| [32] | Priority | Aug. 8, 1966 |
| [33] | | Great Britain |
| [31] | | 30,698/66 |

[54] CONNECTING MEMBER
2 Claims, 3 Drawing Figs.

[52] U.S. Cl. .................................................. 287/20.94,
182/220, 182/228, 248/248
[51] Int. Cl. ....................................................... E04g 3/08,
E06c 7/50, F16b 9/00
[50] Field of Search ........................................... 287/20.94,
20.92, 20.92 C, 20.92 T, 20.92 G; 285/46, 42, 43;
248/239, 235, 250, 216, 210, 238, 248, 225, 224;
182/228, 220; 108/152

[56] References Cited
UNITED STATES PATENTS

| 1,214,220 | 1/1917 | Regar | 285/46 |
| 1,502,154 | 7/1924 | Mueller et al. | 285/46 |
| 2,425,025 | 8/1947 | Boisselier | 287/20.94 |
| 2,567,554 | 9/1951 | Davey | 287/20.92 C |
| 2,985,465 | 5/1961 | Church | 285/42 |
| 792,436 | 6/1905 | Meacham | 182/220 |
| 828,049 | 8/1906 | Pease | 182/220 |
| 1,729,963 | 10/1929 | Pease | 182/228 |
| 1,951,656 | 3/1934 | Haffling | 248/224 |

FOREIGN PATENTS

| 787,685 | 7/1935 | France | 287/20.94 |
| 2,398 | 2/1908 | Great Britain | 248/248 |

*Primary Examiner*—Ramon S. Britts
*Attorney*—Kenneth S. Goldfarb

ABSTRACT: A connecting member for connecting together two flat structural elements, for example a tread and a stringer of an open staircase, with an edge of one structural element abutting the face of the other, the member comprising a channel section metal member to receive an edge of one of the structural elements and two spigots projecting from the base of the channel away from the channel to engage in the other structural element.

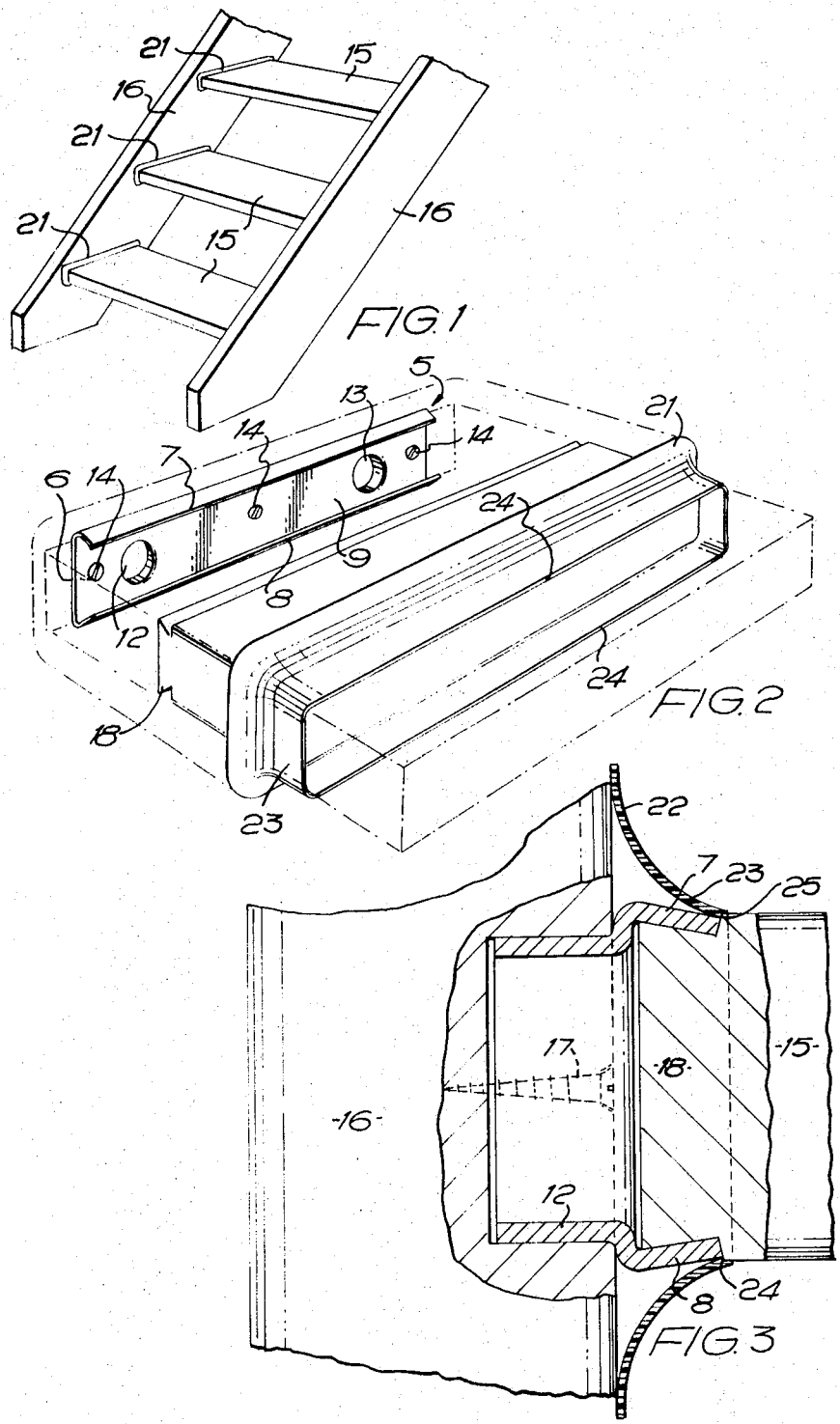

3,591,213

CONNECTING MEMBER

BACKGROUND OF THE INVENTION

This invention concerns a connecting member which is of particular utility in relation to the construction of staircases but which can readily be employed at the junction between two structural elements such as deals, battens, boards, panels or the like, where an end edge of one such element confronts a face of the other element and is required to be secured substantially rigidly and reliably thereto.

In the conventional construction of open-tread wooden staircases, it is usual to fit the treads of the staircase into the parallel stringers by the ends of the treads engaging into appropriate recesses or slots in the confronting faces of the stringers, screws being inserted through the stringers and into the ends of the treads to prevent separation thereof. This means that each of the stringers has to be recessed or slotted accurately for each tread, involving a substantial amount of labor. If any subsequent shrinkage of the wood should occur, gaps appear between the stringers and the treads at the end of the latter, giving the impression of bad fitting of the treads.

An object of the invention is to provide a connecting member suitable for use in connecting together two structural elements as above discussed and which is particularly suitable for use in the manufacture of open-tread staircases as above discussed, the connecting member minimizing the amount of skilled labor required to assemble the treads to the stringers in such staircases thereby reducing considerably the cost of open tread stairs or other structures having members connected together in a similar way.

SUMMARY OF THE INVENTION

With this object in view the present invention provides a connecting member for connecting together two structural elements with an edge of one of the elements confronting a face of the other, the connecting member comprising a body having a cross section such as to provide a channel for the reception of an edge of one structural element and having at its side remote from the channel, a projecting element or elements for engagement in the face of another structure element.

The body may conveniently be simply in the form of a channel-sectioned metal member having projecting elements constituted by spigots formed by drawing or stamping out appropriate parts of the base of the channel.

In a preferred embodiment the side flanges defining the channel converge slightly towards the free edges thereof.

BRIEF DESCRIPTION OF THE DRAWING

In order that the invention may be fully understood, it will be described further, by way of example, with reference to one practical embodiment thereof, it being understood that the details hereinafter set forth are illustrative of and not limitative of the scope of the invention.

The description will be given with reference to the accompanying drawings in which:

FIG. 1 is a perspective view of an open staircase in which the treads are connected to the stringers by connecting members according to the invention;

FIG. 2 is a perspective exploded view showing a connecting member according to the invention and the manner in which it connects two structural elements; and FIG. 3 is a cross section through two structural elements connected by the connecting member shown in FIG. 2.

DESCRIPTION OF THE PREFERRED EMBODIMENT

The connecting member 5 to be described comprises a body in the form of a channel member 6 made of heavy gauge steel plate, the height of the flanges 7 and 8 of the channel being approximately one-third of the overall width of the channel member. The channel member 6 is appropriately formed, e.g. by cold pressing and subsequent bonding in of the flanges, so that the flanges 7 and 8 converge towards one another in the direction towards their free edges, so that the configuration of the channel is equivalent to an undercut slot or dovetail slot.

At its side remote from the flanges, the base web 9 of the channel member 6 is formed with two spaced-apart tubular spigots 12 and 13 projecting perpendicularly from the plane of the base web 9 in the direction opposite to the flanges. These two spigots are formed by appropriate pressing out or stamping out the corresponding material of the base web of the channel member, so that there is an opening through the base web in register with each such spigot. A number of screw holes 14 are provided at intervals along the base member.

Advantageously, the channel member is with spigots as shown and flanges in one cold-pressing operation and the flanges are then bent in to the configuration shown.

In making use of such connecting members for securing the treads 15 to the stringers 16 of an open-tread staircase, the following procedures are adopted. The stringers are prepared by boring blind holes at appropriate positions for reception of respective ones of the spigots 12 and 13 at appropriate tread locations, and the connecting members are fitted into their respective positions, one at each tread level on each stringer, with their spigots engaged into the respective blind holes in the faces of the stringers and the channels directed perpendicularly away from the faces of the stringers. The connecting members are then firmly secured by screws 17 through the screw holes 14. This having been done, and the two stringers being arranged in their correct relative dispositions with the channels thereon aligned and directed towards one another, the treads can simply be inserted in position by sliding their ends into the respective channels. The end edges 18 of the treads are formed to a dovetail shape so that they mate with the channels. If desired, the treads may be secured in the channels by burring over the channels at the corners.

The connecting member described provides a simple expedient eliminating the need for skilled bespoke channelling out of the stringers for reception of the ends of the treads, and enables the staircase to be constructed quickly with a minimum of skilled labor. The resultant connection between the treads and the stringers is extremely firm and secure, the sheer force necessary to deform the spigots relative to the treads and/or spigots being considerably in excess of that which would result in destruction of the treads and stringers.

In the example shown in the drawings, a mask constituted by a moulded plastic sheath 21 of tubular form is provided for covering the connecting members 5 in the assembled staircase. The sheaths 21 are fitted onto the treads 15 before assembly of the staircase, and, after assembly are slid into position over the respective connecting members.

Each sheath 21 comprises a base part 22 which covers the associated connecting member 5 and a mouth part 23 embracing the connecting members and formed with an inner lip 24 which, when the sheath is pushed home into its final position, engages beneath a projecting edge 25 on the dovetail end of the tread and retains the sheath in position.

The connecting members can, of course, be in forms other than that above described, provided they are each in the form of a body having a channel at one side and a projecting element or elements at the other. The projecting elements can, if desired, be separately formed and secured to the body, for example by welding, or riveting. Instead of spigots, the projecting elements may be constituted by teeth projecting from the base of the channel and serving for pressing into the face of a structural element.

When using connecting members having spigots, the bores required in the face of one of the connecting members, for example a stringer for a staircase, can advantageously be formed by a drilling machine having a guide against which the stringer can be placed to be guided beneath a pair of drills carried on an arm adjustable so that the bores for the spigots can be drilled on lines lying at various angles to the lengthwise direction of the stringers. The drilling machine is advantageously provided with a further pivoted guide arm, which may be a hinged or telescopic arm, carrying a member for location in an already-drilled spigot bore. The guide arm cooperates with a stop so positioned that when the locating member is engaged in a spigot bore and the guide arm is swung to meet the stop carrying with it the stringer which is maintained in contact with the guide, then the stringer is correctly positioned between the two drills for drilling of the next pair of spigot bores.

I claim:

1. A connecting member for connecting together two structural elements with an edge of one of the elements confronting a face of the other, said one element having a dovetail end portion, said connecting member comprising a body member of channel shape in cross section including a base and converging flange means for receiving the dovetail end of said one element, spigot means integral with said base and extending oppositely to said flange means for extending into the other element, and a mask for covering said body, said mask comprising a tubular sheath for location on said one element, said sheath including a mouth part having lip means for engagement with said dovetail end portion to retain the sheath in position against said other element.

2. In a construction comprising a plurality of treads and two side stringers and a connecting member for connecting said treads to said stringers, said stringers having blind bores, said treads having dovetailed ends, said connecting member comprising a channel-sectioned strip member of constant cross section and having converging flanges to receive a dovetailed end of one of said treads, said strip member further having hollow cylindrical spigots formed in and integrally with the base of said channel section of said strip member so as to extend from said base in a direction opposite said flanges to be received in said blind bores in said stringer, and a sheath member being provided on said treads, said sheath comprising an endless strip conforming to the shape of the end of said tread and shaped to provide a flaring bell end thereon so that it has a smaller dimensioned lip engaging a tread and a larger dimensioned lip adapted to engage said stringer and mask said connecting member.